United States Patent
Bendak et al.

(10) Patent No.: US 6,973,099 B1
(45) Date of Patent: Dec. 6, 2005

(54) SYSTEM AND METHOD FOR PROGRAMMING THE VALUE OF FRAME SYNCHRONIZATION WORDS IN A MULTIDIMENSIONAL DIGITAL FRAME STRUCTURE

(75) Inventors: George Beshara Bendak, San Diego, CA (US); Alan Michael Sorgi, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 854 days.

(21) Appl. No.: 09/745,655

(22) Filed: Dec. 22, 2000

(51) Int. Cl.[7] ................................................. H04J 3/06
(52) U.S. Cl. ....................... 370/503; 370/509; 370/514
(58) Field of Search ................................. 370/503–509, 370/515, 476

(56) References Cited

U.S. PATENT DOCUMENTS

| | | |
|---|---|---|
| 5,251,205 A | 10/1993 | Callon et al. |
| 5,490,252 A | 2/1996 | Macera et al. |
| 5,568,471 A | 10/1996 | Hershey et al. |
| 5,661,763 A | 8/1997 | Sands |
| 5,666,108 A | 9/1997 | Duffy |
| 5,778,000 A | 7/1998 | Dosiere et al. |
| 5,793,976 A | 8/1998 | Chen et al. |
| 5,854,699 A | 12/1998 | Olshansky |
| 5,875,396 A | 2/1999 | Stockton et al. |
| 5,982,743 A | 11/1999 | Kusano |
| 6,006,069 A | 12/1999 | Langston |

*Primary Examiner*—Seema S. Rao
*Assistant Examiner*—Robert C. Scheibel, Jr.
(74) *Attorney, Agent, or Firm*—Incaplaw; Terrance A. Meador

(57) ABSTRACT

A system and method have been provided for programming synchronization features of a multidimensional digital frame structure. Such a frame structure acts as a digital wrapper, and includes overhead, payload, and forward error correction (FEC) sections. Words in the overhead section are used to synchronize the frame structure. The described invention permits the value of the frame synchronization bytes (FSBs) to be made programmable, so that the system and method are flexible for changes in communication protocols. This flexibility also impacts the quantity, the location, bandwidth, and the bit error rate (BER) of the FSBs.

17 Claims, 5 Drawing Sheets

| SUPERFRAME | | | | | | | | | | | |
|---|---|---|---|---|---|---|---|---|---|---|---|
| OH1 | Data Payload | Parity | OH17 | Data Payload | Parity | OH33 | Data Payload | Parity | OH49 | Data Payload | Parity |
| OH2 | Data Payload | Parity | OH18 | Data Payload | Parity | OH34 | Data Payload | Parity | OH50 | Data Payload | Parity |
| OH3 | Data Payload | Parity | OH19 | Data Payload | Parity | OH35 | Data Payload | Parity | OH51 | Data Payload | Parity |
| OH4 | Data Payload | Parity | OH20 | Data Payload | Parity | OH36 | Data Payload | Parity | OH52 | Data Payload | Parity |
| OH5 | Data Payload | Parity | OH21 | Data Payload | Parity | OH37 | Data Payload | Parity | OH53 | Data Payload | Parity |
| OH6 | Data Payload | Parity | OH22 | Data Payload | Parity | OH38 | Data Payload | Parity | OH54 | Data Payload | Parity |
| OH7 | Data Payload | Parity | OH23 | Data Payload | Parity | OH39 | Data Payload | Parity | OH55 | Data Payload | Parity |
| OH8 | Data Payload | Parity | OH24 | Data Payload | Parity | OH40 | Data Payload | Parity | OH56 | Data Payload | Parity |
| OH9 | Data Payload | Parity | OH25 | Data Payload | Parity | OH41 | Data Payload | Parity | OH57 | Data Payload | Parity |
| OH10 | Data Payload | Parity | OH26 | Data Payload | Parity | OH42 | Data Payload | Parity | OH58 | Data Payload | Parity |
| OH11 | Data Payload | Parity | OH27 | Data Payload | Parity | OH43 | Data Payload | Parity | OH59 | Data Payload | Parity |
| OH12 | Data Payload | Parity | OH28 | Data Payload | Parity | OH44 | Data Payload | Parity | OH60 | Data Payload | Parity |
| OH13 | Data Payload | Parity | OH29 | Data Payload | Parity | OH45 | Data Payload | Parity | OH61 | Data Payload | Parity |
| OH14 | Data Payload | Parity | OH30 | Data Payload | Parity | OH46 | Data Payload | Parity | OH62 | Data Payload | Parity |
| OH15 | Data Payload | Parity | OH31 | Data Payload | Parity | OH47 | Data Payload | Parity | OH63 | Data Payload | Parity |
| OH16 | Data Payload | Parity | OH32 | Data Payload | Parity | OH48 | Data Payload | Parity | OH64 | Data Payload | Parity |
| FRAME 1 | | | FRAME 2 | | | FRAME 3 | | | FRAME 4 | | |

FIG. 2

SYSTEM AND METHOD FOR PROGRAMMING THE VALUE OF FRAME SYNCHRONIZATION WORDS IN A MULTIDIMENSIONAL DIGITAL FRAME STRUCTURE

RELATED APPLICATIONS

This application contains material related to the following commonly assigned copending U.S. Patent Applications incorporated herein by reference:

Ser. No. 09/746,490 filed Dec. 22, 2000 for "SYSTEM AND METHOD FOR PROGRAMMING THE LOCATION OF FRAME SYNCHRONIZATION WORDS IN A MULTIDIMENSIONAL DIGITAL FRAME STRUCTURE", currently pending.

Ser. No. 09/747,380 filed Dec. 22, 2000 for "SYSTEM AND METHOD FOR PROGRAMMING THE BIT ERROR RATE OF FRAME SYNCHRONIZATION WORDS IN A MULTIDIMENSIONAL DIGITAL FRAME STRUCTURE", currently pending.

Ser. No. 09/746,152 filed Dec. 22, 2000 for "SYSTEM AND METHOD FOR PROGRAMMING THE QUANTITY OF FRAME SYNCHRONIZATION WORDS IN A MULTIDIMENSIONAL DIGITAL FRAME STRUCTURE", currently pending.

Ser. No. 09/745,793 filed Dec. 22, 2000 for "SYSTEM AND METHOD FOR SELECTIVELY BROADCASTING A MULTIDIMENSIONAL DIGITAL FRAME STRUCTURE", currently pending.

Ser. No. 09/747,072 filed Dec. 22, 2000 for "SYSTEM AND METHOD FOR PROGRAMMING LOSS OF SYNCHRONIZATION IN A MULTIDIMENSIONAL DIGITAL FRAME STRUCTURE", now U.S. Pat. No. 6,836,485.

Ser. No. 09/745,774 filed Dec. 22, 2000 for "SYSTEM AND METHOD FOR PROGRAMMING SYNCHRONIZATION CRITERIA IN A MULTIDIMENSIONAL DIGITAL FRAME STRUCTURE", U.S. Pat. No. 6,847,657.

Ser. No. 09/746,159 filed Dec. 22, 2000 for "SYSTEM AND METHOD FOR TRANSLATING OVERHEAD BYTES IN A MULTIDIMENSIONAL DIGITAL FRAME STRUCTURE", currently pending.

Ser. No. 09/527,343, filed 17 Mar. 2000 for "TRANSPOSABLE FRAME SYNCHRONIZATION STRUCTURE", currently pending.

Ser. No. 09/528,021, filed 17 Mar. 2000 for "PROGRAMMABLE SYNCHRONIZATION STRUCTURE WITH AUXILIARY DATA LINK", U.S. Pat. No. 6,795,451.

BACKGROUND OF THE INVENTION

1. Field of the Invention

This invention generally relates to digital wrapper formatted communications and, more particularly, to a system and method for programming the selection of frame synchronization word values in the communication frame structure.

2. Description of the Related Art

Frame synchronization is used in most communication technologies where extra bandwidth is required to add functionality into the original data stream. There is no standard practice with respect to the bandwidth allocation of frame synchronization words. Neither is there an ability to customize the use of that bandwidth and synchronization thresholding adaptive to various bit error rate conditions in a variable rate forward error correction (FEC) system implementing interleaved multi-frame superframes.

It would increase bandwidth if all the bytes, or words of a digital frame structure could be devoted to payload. However, a significant portion of the frame is devoted to FEC to remove errors that are introduced in data transmission lines. Even fiber optic systems can be noisy enough to introduce errors, when the distance between nodes is great enough. Part of the frame must also be used for maintenance functions between communication nodes. Further, a portion of the frame must be devoted to synchronization. The synchronization function becomes even more critical when the frames are scrambled to randomize the data density. These maintenance and synchronization bytes reside in the overhead section of the frame. However, as mentioned above, there is no standard protocol defining the quantity, location, or value of frame synchronization bytes. Hardware devoted to any particular protocol or implementation quickly becomes obsolete. An exclusively software approach to managing communications is cumbersome.

In TRANSPOSABLE FRAME SYNCHRONIZATION STRUCTURE, invented by Giorgetta et al., Ser. No. 09/527,343, currently pending, filed on Mar. 17, 2000, by the same assignee as the instant invention, a method is disclosed for manipulating the bits, inside a particular overhead byte, for the purpose of synchronization. An invention that expanded this concept to the frame level would be even more useful.

It would be advantageous if communication hardware could be developed that permitted flexibility in defining the frame synchronization bytes, so as to permit the hardware to be used in a number of communication standards.

It would be advantageous if the values of frame synchronization bytes (FSBs) could be made selectable in a multidimensional digital frame structure.

Likewise, it would be advantageous if the quantity, location, and bit error rates of the FSBs could be made selectable to accommodate a number of communication standards, or changes to existing standards.

SUMMARY OF THE INVENTION

Accordingly, an integrated circuit communication device is provided that includes programmable features to allocate bandwidth for frame synchronization words and set up the error thresholding, adjusting the robustness to bit errors and the time required to achieve synchronization. More specifically, the device provides for:

a programmable frame synchronization word bandwidth;
programmable frame synchronization words;
different synchronization words with independent allocated bandwidths;
frame synchronization word translation between the decoder and encoder;
frame synchronization word error thresholding for system robustness;
programmable synchronization (in-to-sync) parameters; and
programmable out-of-sync synchronization parameters.

Broadly, this invention describes a structure for programming key features for a frame synchronization system using a multidimensional digital frame. More particularly, an example of the invention is provided in a programmable framing structure for a forward error correction (FEC) encoded channel interleaved to 16 levels with a 4 frame superframe. The structure provides the user the ability to allocate the amount of bandwidth dedicated to the frame synchronization words, to control the speed of synchronization and the robustness to channel noise. As an added benefit, a programmable synchronization threshold can be set to even further increase the robustness to channel noise and to decrease the synchronization time under high bit error rate conditions. These techniques together allow users to increase network security and partitioning as well as to dynamically reallocate the bandwidth occupied for framing based on link conditions without corrupting user data.

Details of the programmable communication integrated circuit (IC) and a method for variably programming the frame synchronization structure in a multidimensional digital frame structure are provided below.

BRIEF DESCRIPTION OF THE DRAWING

FIG. 2 is a diagram illustrating a multidimensional digital frame structure.

DETAILED DESCRIPTION OF THE PREFERRED EMBODIMENTS

Figure 1:
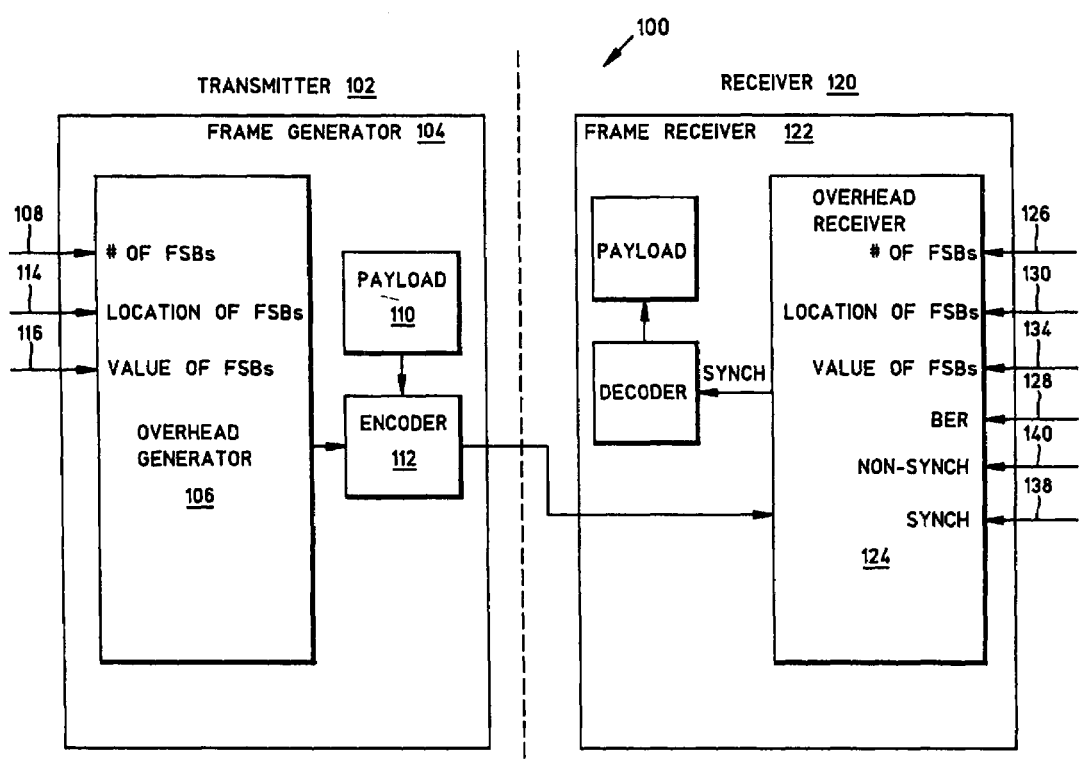
FIG. 1 is a schematic block diagram of a system for variably programming frame synchronization in the communication of a multidimensional digital frame structure.

FIG. 1 is a schematic block diagram of a system for variably programming frame synchronization in the communication of a multidimensional digital frame structure. The system 100 comprises a transmitter 102 with a frame generator 104. The frame generator 104 includes an overhead generator 106 having an input to accept commands on line 108 for selecting the quantity of synchronization bytes in the overhead section of a frame. A payload generator 110 supplies the information that is to be transmitted. The information can be generated at the transmitter 102, or it can be the payload of a previously received frame. In this case, the transmitter 102 would be acting as a relay. The frame generator 104 also includes an FEC section, or encoder 112. The encoder codes the payload so that errors due to degradation can be removed at the destination. In some aspects of the invention, parts of the DOCKET NO. AMCC4840 overhead section, or the entire overhead section is encoded, along with the payload. Commands to select FSB locations are accepted on line 114, and commands to select FSB values are accepted on line 116. The value of an overhead byte is defined herein to be content of the byte and is typically expressed as a BCD number.

FIG. 2 is a diagram illustrating a multidimensional digital frame structure. As can be seen from examining Frame 1, each frame is considered to be multidimensional because it includes a plurality of rows, where each row includes an overhead byte, payload bytes, and parity (FEC) bytes. The present invention is not limited to any particular quantity of bytes to the overhead, payload, and FEC sections, or to any particular number of rows. The multidimensional frame structure is also referred to as a digital wrapper.

Returning to FIG. 1, the system 100 includes a receiver 120 with a frame receiver 122. The frame receiver 122 includes an overhead receiver 124 with an input on line 126 to accept commands for selecting the quantity of frame synchronization bytes for synchronizing the received frame. The overhead receiver 124 synchronizes the frame in response to recognizing the selected frame synchronization bytes. In other aspects of the invention, the frame synchronization function is performed by other elements of the receiver 120 (not shown). Once the FSBs have been identified, synchronization is possible. The frame can be decoded and the payload identified. In some aspects of the invention, the receiver 120 is part of a relay, and the payload is relayed as is, or modified before it is retransmitted. Commands to accept FSB bit error rates are accepted on line 128, commands to accept FSB locations are accepted on line 130, and commands to accept FSB values are accepted on line 134.

As noted above, the overhead generator 106 is able to select FSB values to be inserted into the overhead section. Since the frame generator 104 supplies a frame with a first plurality of overhead bytes, the overhead generator 106 accepts commands to select frame synchronization byte values in the range from zero to the first plurality, for each frame. Further, the overhead generator 106 selects a second plurality of bits for each frame synchronization byte value, where each byte includes the second plurality of bits. In short, the overhead generator 106 is able to select frame synchronization byte values from a plurality of byte values.

In some aspects of the invention, the frame generator 106 forms a superframe structure with a predetermined number of frames per superframe. Then, the overhead generator 106 selects frame synchronization byte values for the overhead section of each frame of the superframe.

In some aspects of the invention, the overhead generator 106 selects the quantity of frame synchronization byte values in the overhead section of each frame. For example, the frame generator 104 forms a superframe with a first and a second frame. Then, the overhead generator 106 supplies a first number of selected frame synchronization byte values for the first frame and a second number of frame synchronization byte values for the second frame.

More generally, this invention makes it possible to program the value of any FSB or overhead byte, in every frame. Within the context of a frame, each FSB value may be different. With respect to the frame structure of FIG. 2, each frame could include up to sixteen different FSB values. Further, the FSB values are programmable between frames. The FSB values in Frame 2 may be the same as in Frame 1, or at the other extreme, sixteen totally different FSB values may be used. As presented below, the location and quantity of these FSB values can act to further differentiate frames.

In some aspects of the invention, the overhead generator 106 has an input to accept commands for selecting the location of each frame synchronization byte value. For example, the overhead generator 106 selects first frame synchronization byte values in a first number of locations, and second frame synchronization byte values in a second number of locations. The locations may remain constant across the span of multiple frames, or they may vary each frame. It should also be remembered that FSBs need not appear in every frame.

Since the frame receiver 102 supplies a frame with a first plurality of overhead bytes, the overhead receiver 124 can accept commands to select frame synchronization byte values in the range from zero to the first plurality. That is, the overhead receiver 124 selects frame synchronization byte values, in each frame, in the range from zero to the first plurality of byte values. For example, the overhead receiver 124 selects first frame synchronization bytes having a first value, and second frame synchronization bytes having a second value.

It should also be understood that FSBs can be differentiated by combining FSB values with FSB location and quantity. For example, synchronization can be based upon criteria such as a pattern if three 00 FSB byte values followed by four FF FSB byte values. Alternately, synchronization could be dependent upon the FSB value 00 appearing in locations OH1, OH3, and OH5, and the FSB value FF appearing in locations OH2, OH4, and OH6.

In some aspects of the invention, the frame receiver 122 forms a superframe structure with a predetermined number of frames per superframe. The overhead receiver 124 selects the values of frame synchronization bytes required for the recognition of a received frame from the overhead section of each frame of the superframe. For example, the frame receiver 122 forms a superframe with a first and a second frame. Then, the overhead receiver 124 selects first frame synchronization byte values for the first frame and second frame synchronization byte values for the second frame.

In some aspects of the invention, the overhead receiver 124 has an input to accept commands for selecting the bit error rate required for the recognition of each selected frame synchronization byte value. The overhead receiver 124 typically selects an average BER for the selected FSB value in some aspects of the invention, typically, over the span of a frame. That is, the BER of the FSBs are averaged across the span of a frame, and the frame is recognized if the average BER is less than, or equal to, the selected BER. The BER selection can make the FSB value criteria less critical, since an "incorrect" FSB value can be the result of an intentionally sent FSB or a transmission error.

In some aspects of the invention, the overhead receiver 124 accepts commands to select locations for the frame synchronization byte values in the overhead section. For example, the overhead receiver 124 selects first byte locations for first frame synchronization byte values. Alternately, the overhead receiver 124 accepts commands to select first byte locations for first frame synchronization byte values in a first frame, and second byte locations for second frame synchronization byte values in a second frame.

Returning to FIG. 2, it can be seen that a superframe includes a plurality of frames. Four frames are shown, but the present invention is not limited to any particular number of frames per superframe. Returning to FIG. 1, the frame generator 104 defines a superframe structure with a predetermined number of frames per superframe. Then, the overhead generator 106 selects frame synchronization byte values in the overhead section of each frame of the superframe. Likewise, the overhead receiver 124 recognizes frame synchronization bytes in each frame of the superframe. In some aspects of the invention, the overhead receiver 124 selects the quantity of frame synchronization bytes required for recognition, for each frame.

In some aspects of the invention, the frame generator 104 forms a superframe consisting of a first, second, third, and fourth frame, and the overhead generator 106 supplies a first frame synchronization byte value for the first frame, a second value for the second frame, a third byte value for the third frame, and a fourth byte value for the fourth frame. The first, second, third, and fourth byte values need not necessarily be different. Each frame may include more than one FSB value, or the value may be repeated in more than one byte per frame. Typically, however, only the first frame includes FSB bytes, so that the overhead generator selects a second, third, and fourth number of byte values equal to zero. In the simple case, the frame receiver 122 forms a superframe consisting of a first, second, third, and fourth frame, and the overhead receiver 124 selects the first byte value for the first frame, the second byte value for the second frame, the third byte value for the third frame, and the fourth byte value for the fourth frame. Again, it is typical that the overhead receiver 124 selects a second, third, and fourth number of byte values equal to zero.

The overhead receiver 124 also selects the number of consecutive frames that must be recognized on line 138, and synchronizes the received superframe in response to the selected number of recognized frames. For example, the system may require that FSBs in two consecutive frames be identified, before a superframe is recognized. Likewise, the system may require that a plurality of consecutive superframes be recognized before synchronization occurs.

In a simple aspect of the invention, the overhead generator 106 selects a first number of frame synchronization byte values in the overhead section of a frame, and the overhead receiver 124 selects the first number of frame synchronization byte values for recognition for the first frame. However, the overhead receiver need not select all the FSBs that have been supplied by the overhead generator 106. For example, when the overhead generator supplies a first number of frame synchronization byte values for a first frame, the overhead receiver 124 can select a second number of byte values, less than the first number, for the first frame. The overhead receiver synchronizes the received frame in response to recognizing the second number of frame synchronization byte values in the first frame.

Further, the overhead generator 106 can supply a first quantity of FSBs in a first frame and a second quantity of FSBs in the second frame. The overhead receiver 124 can synchronize using the first quantity of FSB values in the first frame and the second quantity of FSBs in the second frame. However, as explained, the overhead receiver 124 is not required to use all the FSBs that are generated.

As mentioned above, the overhead receiver 124 has an input on line 128 to accept commands for selecting the bit error rate (BER) required for the recognition of a frame synchronization byte. In some aspects, the BER for individual FSB can be selected. The BER can be set for different values in recognizing FSBs in a single frame. Likewise, the BER can be set for different values between frames, or between superframes. The BER can be made to correspond to the FSB location and/or the FSB value. Typically, however, the selected BER is the average BER of FSBs across the span of a frame. Regardless, the overhead receiver 124 recognizes frame synchronization bytes having a bit error rate less than, or equal to, the selected frame synchronization bit error rates.

As mentioned above, the FSB locations are selectable. The frame locations can vary between frames, and between superframes. For example, the overhead receiver 124 selects a first number of FSB byte values in a first number of frames and a second number of FSB byte values in a second number of locations. Likewise, a first number of locations can be selected in a first frame of the superframe, and a second number of locations in a second frame. The overhead receiver 124 synchronizes the received frame in response to recognizing frame synchronization bytes in the first number of selected locations in the first frame and the second number of selected locations in the second frame.

Looking a FIG. 2 momentarily to refine the above-mentioned example, locations OH 1, OH 2, and OH 3 can be selected for the first frame, while locations OH 5, OH 6, and OH 7 can be selected for the second frame. This example would, of course, require the overhead generator 106 to supply FSBs in at least the above-mentioned byte locations.

In a simple aspect of the invention, the overhead generator 106 selects a first number of locations for a first number of frame synchronization bytes, in response to commands on line 130, and the overhead receiver 124 selects the first number of locations for the first number of frame synchronization bytes. However, the overhead receiver need not select all the location provided by the overhead generator 106. For example, the overhead generator 106 selects a first number of locations for a first number of frame synchronization bytes, and the overhead receiver 124 selects a second number of locations for a second number of frame synchronization bytes, less than the first number, and synchronizes the received frame in response to recognizing frame synchronization bytes in the second number of selected locations. Momentarily examining FIG. 2, the overhead generator 106 may supply FSBs in locations OH 1 through OH 6, while the overhead receiver selects locations OH 4 through OH 6 for use.

As mentioned above, the overhead receiver 124 synchronizes the received frame in response to recognizing the values of synchronization bytes. Typically, the FSB word is a byte of eight bits, although the invention is not limited to an FSB word of any particular length. With eight bit values, $2^8$ possible FSB values are possible for every FSB. Likewise, the FSB values may vary inside a frame. If a frame includes a first plurality, i.e., sixteen, overhead bytes, and sixteen FSBs are selected, then each of the sixteen FSBs may be the same byte value. On the other extreme, each FSB byte value may be different, and sixteen FSB values can be used in the frame. Thus, each frame can be synchronized using FSBs having different values.

In one aspect of the invention, the overhead receiver 124 selects first frame synchronization bytes having a first value and second frame synchronization bytes having a second value. Then, the overhead receiver 124 synchronizes the received frame in response to recognizing the first frame synchronization bytes having the first value and the second frame synchronization bytes having the second value. Although an example using two different FSB values is presented above, it is possible to have as many FSBs as there are rows in a frame. Thus, in the frame structure of FIG. 3, each frame could have a first plurality (sixteen in the example of FIG. 2) unique FSB values. Even more FSB values could be used if a greater portion of each row was devoted to the overhead section, at the expense of the payload or FEC sections.

Likewise, the value of the FSBs can change between frames. In some aspects of the invention, the overhead receiver 124 selects frame synchronization bytes having a first value in a first frame and frame synchronization bytes having a second value in a second frame. The overhead receiver synchronizes the received frame in response to recognizing the frame synchronization bytes having the first value in the first frame and the frame synchronization bytes having the second value in the second frame.

In a simple aspect of the invention, the overhead generator 106 selects frame synchronization bytes having a first value, in response to commands on line 116, and the overhead receiver 124 selects frame synchronization bytes having the first value. However, the overhead receiver 124 need not select all the FSB values supplied by the overhead generator. For example, the overhead generator 106 selects a first number of frame synchronization bytes having a first value in a first number of locations and a second number of frame synchronization bytes in a second number of locations having a second value. The overhead receiver 124 selects a third number of frame synchronization bytes in a third number of locations, less than the first number, having the first value, and a fourth number of frame synchronization bytes in a fourth number of locations, less than the second number, having the second value. The overhead receiver 124 synchronizes the received frame in response to recognizing the third number of frame synchronization bytes having the first value in the third number of locations, and the fourth number of frame synchronization bytes having the second value in the fourth number of locations.

When the overhead receiver is not able to recognize FSBs, synchronization is lost. Once again, the way in which the system loses synchronization is programmable. The overhead receiver 124 accepts commands on line 140 for selecting a number of consecutive non-recognized frames. Then, the overhead receiver 124 falls out of synchronizing in response to the selected number of consecutively non-recognized frames.

Figure 3:
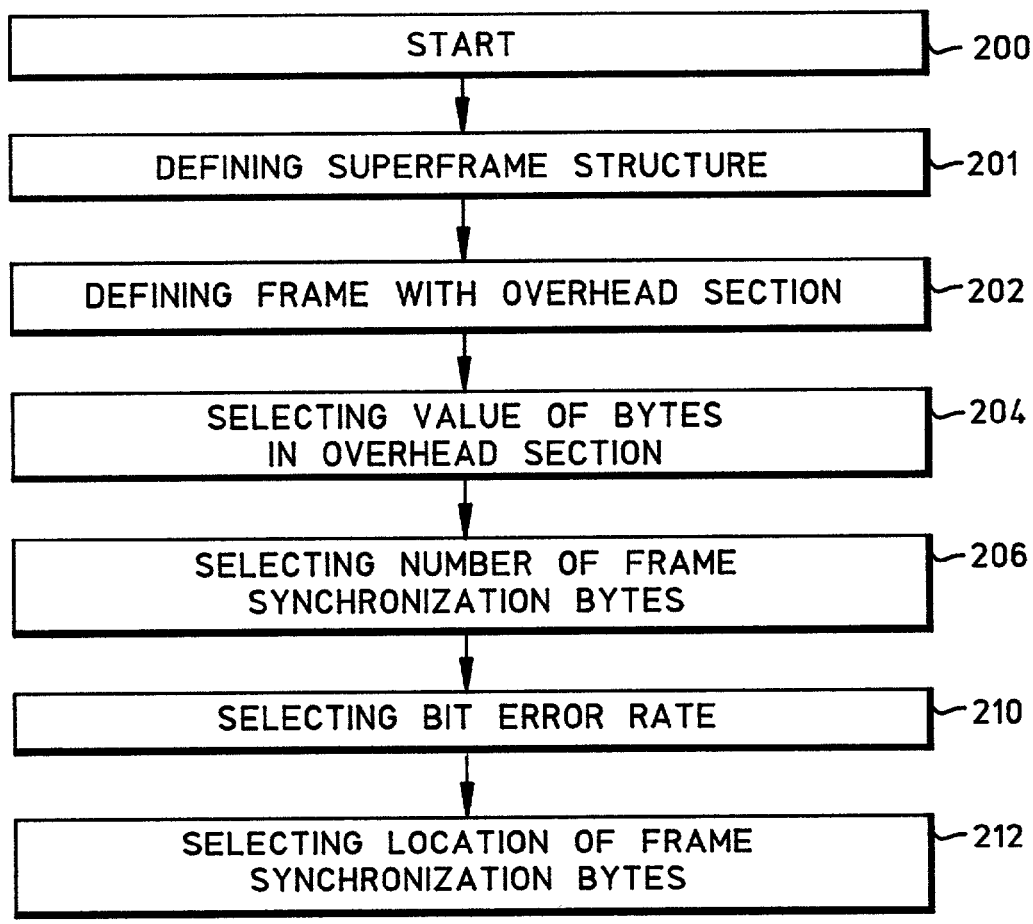
FIG. 3 is a flowchart depicting a method for variably programming the value of frame synchronization bytes in a multidimensional digital frame structure.

FIG. 3 is a flowchart depicting a method for variably programming the value of frame synchronization bytes in a multidimensional digital frame structure. Although the method is depicted as a sequence of numbered steps for clarity, no order should be inferred from the numbering unless explicitly stated. The method begins at Step 200. Step 202 defines a frame with an overhead section having a predetermined number of bytes. Step 204 selects the values of the bytes in the overhead section to be used for frame synchronization.

In some aspects of the invention, defining the frame in Step 202 includes defining the overhead section having a first plurality of overhead byte locations. Selecting the values of the bytes in the overhead section to be used for frame synchronization in Step 204 includes selecting values in the range from zero to a first plurality of byte values.

In some aspects of the invention, defining a frame in Step 202 includes defining each frame synchronization byte as having a second plurality of bits. Selecting the value of the frame synchronization bytes in Step 204 includes selecting a second plurality of bits for each frame synchronization byte. For an eight-bit byte, $2^8$ FSB values are possible.

In some aspects of the invention, selecting the value of frame synchronization bytes in the overhead section in Step 204 includes selecting a plurality of frame synchronization byte values.

For example, selecting frame synchronization byte values in Step 204 includes selecting frame synchronization bytes having a first value and frame synchronization bytes having a second value.

In some aspects, Step 206 selects the quantity of bytes in the overhead section to be used for frame synchronization. Defining the frame in Step 202 includes defining the overhead section having a first plurality of bytes. Selecting the quantity of bytes in the overhead section in Step 206 includes selecting a first quantity of bytes in the range from zero to the first plurality of bytes. Selecting the value of the frame synchronization bytes in the overhead section in Step 204 includes selecting up to a first quantity of byte values, depending on the number of FSBs selected, and the variety of FSB values desired.

Step 201 defines a superframe structure with a predetermined number of frames per superframe. Selecting the value of frame synchronization bytes in the overhead section in Step 204 includes selecting the values of bytes in the overhead section of each frame.

In some aspects of the invention, defining a superframe structure with a predetermined number of frames per superframe in Step 201 includes defining a first and a second frame in the superframe. Selecting the value of frame synchronization bytes in the overhead section in Step 204 includes selecting a first byte value in the first frame and a second byte value in the second frame.

In some aspects, defining a superframe structure with a predetermined number of frames per superframe in Step 201 includes defining a superframe consisting of a first, second, third, and fourth frame. Selecting the value of frame synchronization bytes in the overhead section in Step 204 includes selecting a first byte value in the first frame, a second byte value in the second frame, a third byte value in the third frame, and a fourth byte value in the fourth frame. In some aspects of the invention, selecting the value of frame synchronization bytes in the overhead section in Step 204 includes selecting a value of zero in the second, third, and fourth frames.

In some aspects, Step 210 selects the bit error rate of the frame synchronization byte values. Selecting a frame synchronization byte bit error rate in Step 210 includes selecting an average BER for the FSB values selected in Step 204. Selecting an FSB value in Step 204 includes selecting a FSB value having a selected BER.

Some aspects of the invention include a further step. Step 212 selects the location of the frame synchronization bytes in the overhead section. Selecting the location of frame synchronization byte in Step 212 includes selecting frame synchronization bytes having a first value in a first location, and frame synchronization bytes having a second value in a second location. Selecting the FSB locations in Step 212 includes selecting a first FSB location for a first location. Likewise, a first plurality of FSB values can be selected for a first plurality of locations, where the overhead section includes a first plurality of bytes.

Figure 4:
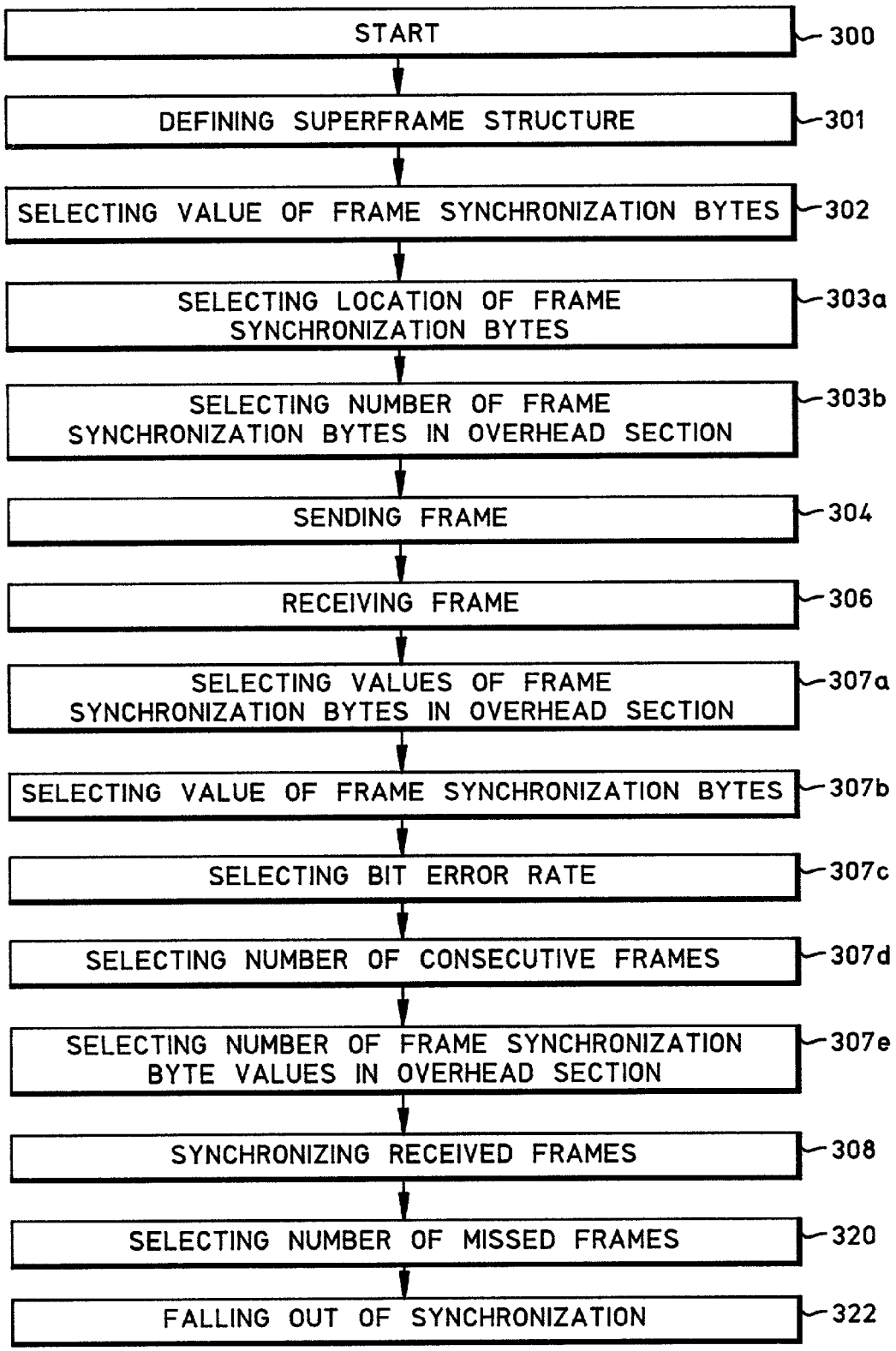
FIG. 4 is a flowchart depicting a method for variably programming the value of frame synchronization bytes in the communication of a multidimensional digital frame structure

FIG. 4 is a flowchart depicting a method for variably programming the value of frame synchronization bytes in the communication of a multidimensional digital frame structure. The method begins at Step 300. Step 302 selects the value of frame synchronization bytes in the overhead section of a transmitted frame. Step 304 sends the frame. Step 306 receives the frame. Step 308 synchronizes the received frame in response to recognizing the frame synchronization bytes.

Step 307a selecting the values of the frame synchronization bytes in the overhead section of the received frames. Synchronizing the received frames in response to recognizing the frame synchronization bytes in Step 308 includes synchronizing received frames in response to recognizing the synchronization byte values in the received frames.

In some aspects of the invention, selecting the frame synchronization byte values in the received frame in Step 307a includes selecting a first frame synchronization byte value. Synchronizing the received frame in response to recognizing the frame synchronization bytes in Step 308 includes synchronizing the received frame in response to recognizing the first frame synchronization byte value.

In some aspects, Step 303 selects the location of the frame synchronization byte values in a transmitted frame. Step 307b selects the location of the frame synchronization bits in the received frame.

In some aspects of the invention, selecting the location of the frame synchronization byte values in a transmitted frame in Step 303 includes selecting first locations for a first byte value, and second locations for a second byte value. Synchronizing the received frame in response to recognizing the frame synchronization bytes in Step 308 includes synchronizing the received frame in response to recognizing the first frame synchronization byte values in the first selected locations and the second byte values in the second selected locations.

In some aspects of the invention, selecting the location of frame synchronization byte values in the overhead section of a transmitted frame in Step 303a includes selecting first frame synchronization byte values in the first locations. Selecting the location of the bytes to be used for frame synchronization of the received frame in Step 307b includes selecting the first frame synchronization byte values in the first locations.

In some aspects, selecting the locations of frame synchronization byte values in the overhead section of a transmitted frame in Step 303a includes selecting a first frame synchronization byte value in a first number of locations. Selecting the location of the frame synchronization byte values in the received frame in Step 307b includes selecting the first frame synchronization byte value in a second number of locations, less than the first number. Synchronizing the received frame in response to recognizing the frame synchronization bytes in Step 308 includes synchronizing the received frame in response to recognizing the first frame synchronization byte value in the second number of locations.

In some aspects, Step 307c selects the bit error rate of the frame synchronization byte values. Selecting a bit error rate in Step 307c includes selecting an average BER for the FSB values selected in Step 307a.

In some aspects of the invention, synchronizing the received frame in response to recognizing the frame synchronization byte values in Step 308 includes recognizing frame synchronization byte values having a bit error rate less than, or equal to, the selected frame synchronization bit error rates.

In some aspects, Step 301 defines a superframe structure with a predetermined number of frames per superframe. Selecting the value of frame synchronization bytes in the overhead section of a frame in Step 302 includes selecting a quantity of byte values to be used for synchronization in the overhead section of each frame of the superframe. Sending the frame in Step 304 includes sending frames in the superframe structure. Synchronizing the received frame in response to recognizing the frame synchronization bytes in Step 308 includes recognizing frame synchronization byte values in each frame of the superframe.

Step 307d selects the number of consecutive frames with recognized FSBs necessary for synchronization to occur. Synchronizing the received frame in response to recognizing the frame synchronization bytes in Step 308 includes synchronizing the received frame in response recognizing the selected frame synchronization values in the selected number of consecutive frames.

In some aspects of the invention, Step 307e selects the quantity of frame synchronization byte values in the overhead section of the received frame. Selecting the quantity of frame synchronization byte values in a received frame in Step 307e includes selecting a quantity of byte values for each frame of the superframe. Synchronizing the received frame in response to recognizing the frame synchronization bytes in step 308 includes recognizing the selected quantity of frame synchronization byte values in each frame of the superframe.

In some aspects of the invention, selecting the quantity of frame synchronization byte values in Step 307e includes selecting a first number of frame synchronization byte values of a first frame. Synchronizing the received frame in response to recognizing frame synchronization bytes in Step 308 includes recognizing the first number of frame synchronization byte values in the first frame.

In some aspects of the invention, selecting the quantity of each frame synchronization byte values in the received frame in Step 307e includes selecting a first number of frame synchronization bytes having a first value, and a second number of frame synchronization bytes having a second value. Synchronizing the received frame in response to recognizing the frame synchronization bytes in Step 308 includes synchronizing the received frame in response to recognizing the first number of frame synchronization bytes having the first value, and the second number of frame synchronization bytes having the second value.

Step 303b selects the quantity of frame synchronization bytes in the overhead section of a transmitted frame. Selecting the quantity of the frame synchronization byte values in the transmitted frame in Step 303b includes selecting a first number of fame synchronization bytes having a first value, and a second number of frame synchronization bytes having a second value. Selecting the value of each frame synchronization byte in the received frame in Step 307e includes selecting a third number of frame synchronization bytes, less than the first number, having the first value, and a fourth number of frame synchronization bytes, less than the second number, having the second value. Synchronizing the received frame in response to recognizing the frame synchronization bytes in Step 308 includes synchronizing the received frame in response to recognizing the third number of frame synchronization bytes having the first value, and the fourth number of frame synchronization bytes having the second value.

Some aspects of the invention include further steps. Step 320 selects a number of consecutive received frames in which frame synchronization byte values are not recognized. In Step 322 the received frames fall out of synchronization in response to not recognizing frame synchronization byte values in the selected number of received frames selected in Step 320.

An example of the above broadly-stated invention is presented below. The typical frame structure uses a 255-byte FEC code as the basic building block which is referred to as a subframe, or row. Each subframe is defined by a Reed-Solomon (RS) codec that is intended to provide 8 byte correction capability over the 255-byte block. This codec is referred to as RS(255,239) for 8 byte correction.

Figure 5:
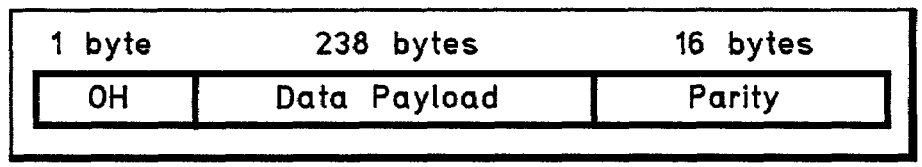
FIG. 5 is an example of a subframe consisting of a 255-byte RS(255,239) block with an overhead (OH) byte as the first byte, followed by 238 user payload bytes, and 16 bytes of RS parity.

FIG. 5 is an example of a subframe consisting of a 255-byte RS(255,239) block with an overhead (OH) byte as the first byte, followed by 238 user payload bytes, and 16 bytes of RS parity. The OH byte may be used as an FSB or other programmable function.

Figure 6:
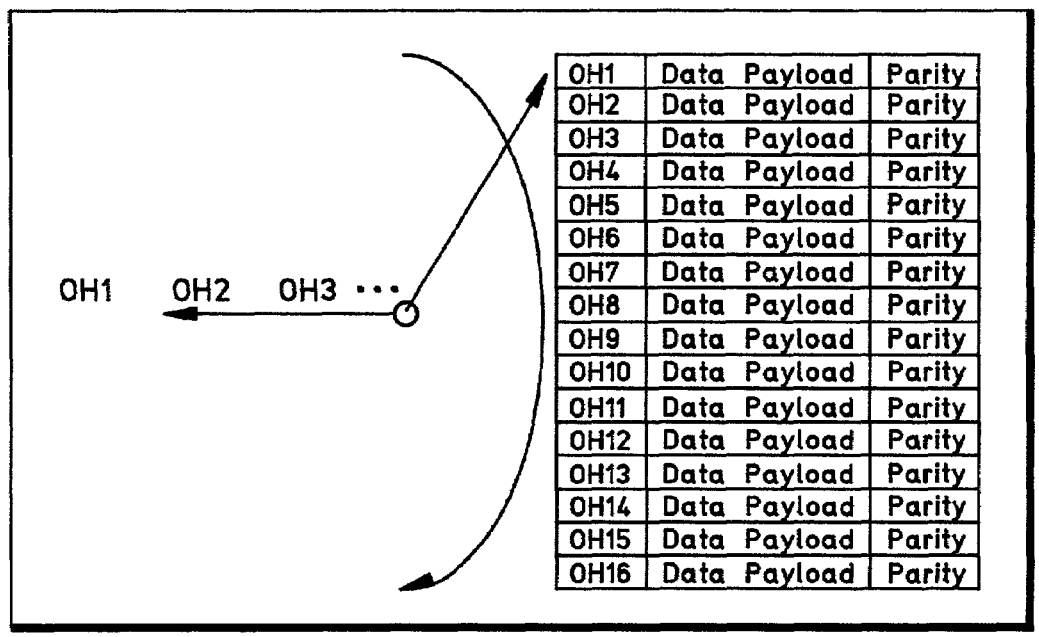
FIG. 6 illustrates the stacking of subframes in a frame.

FIG. 6 illustrates the stacking of subframes in a frame. The subframes are stacked in a structure that is 16 deep to create a frame as shown in FIG. 2. The bytes are transmitted in an interleaved fashion from top to bottom and left to right. Four frames are used to create a superframe as shown in FIG. 2. A superframe contains 64 overhead locations. The frames are transmitted in order from frame 1 to frame 4.

The first frame in the superframe is the one that traditionally contains frame synchronization bytes. The user may select to have two different FSB types (FSB1 and FSB2). The ability to have two different FSBs and the ability to program them with custom values provide the user added control over their system both in terms of resistance to false synchronization and the ability to distinguish different data sources from each other. This is useful when there are multiple wavelengths that can be received, all carrying the same frame structure, but only one of which is allowed/permissioned to be received at a particular node. Table 1 provides an example of how the FSB types are defined.

TABLE 1

Frame Synchronization Byte Definitions

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | | | | FSB 2 | | | | | | | | FSB 1 | | | | |
| Mode | rw | rw | rw | rw | rw | rw | rw | rw | rw | rw | rw | rw | rw | rw | rw | rw |
| Default | 0 | 0 | 1 | 0 | 1 | 0 | 0 | 0 | 1 | 1 | 1 | 1 | 0 | 1 | 1 | 0 |

| Bit Positions | Function | Description |
|---|---|---|
| 15:8 | FSB 2 | Frame Synchronization Byte 2 (Default value = 28h) |
| 7:0 | FSB 1 | Frame Synchronization Byte 1 (Default value = F6h) |

Accommodations are made for two separate frame synchronization bytes.

The FSBs are also programmable in number. In Frame 1, OH 1 to OH 16 can be programmed to be FSB1, FSB2, or a non-FSB function. This expands on the variability afforded by having two different FSBs. By using more of the available bandwidth for FSBs, the user decreases the chance of false synchronization and in general, decreases the amount of time required to acquire synchronization. The user can customize this parameter to optimize for specific requirements and link conditions.

Table 2 demonstrates the structure required to indicate which OH bytes are used for FSBs and Table 3 illustrates the structure that sets whether to use FSB1 or FSB2. The FSB programmability exists independently in both the transmit and receive portions of the device. In the receive section of the device, the quantity of recognized consecutive FSB groups required to declare synchronization is programmable, as well as the number of bad consecutive FSB groups required to lose synchronization. This is the first level of thresholding for adjusting the tolerance to bit error rate and the amount of time required to declare synchronization. Table 4 is an example of synchronization parameter setting. The fewer consecutive FSB groups required to achieve synchronization, the shorter the acquisition time. The more consecutive bad FSB groups required to lose synchronization, the greater the system tolerance of higher bit error rates.

The second level of thresholding is to define what is considered a good group of FSBs vs. a bad group of FSBs. This is done by specifying the number of errors that are allowed within a group of FSBs and still be considered good as shown in Table 4. This feature has the advantage of decreasing synchronization time in the presence of high bit error rates. Longer FSB groups are permitted which decrease the probability of false synchronization, without incurring the penalty of difficult synchronization in the presence of noise. Further, the FEC code is given greater opportunity to correct errors.

Another benefit of the second level of thresholding is the ability to dynamically customize the values of the FSBs. This thresholding provides network security, and dynamically allocates more bytes for synchronization based on the link conditions, without causing a resynchronization to occur.

TABLE 2

Frame Synchronization Byte Locations Register

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | OH#1 | OH#2 | OH#3 | OH#4 | OH#5 | OH#6 | OH#7 | OH#8 | OH#9 | OH#10 | OH#11 | OH#12 | OH#13 | OH#14 | OH#15 | OH#16 |
| Mode | rw | rw | rw | rw | rw | rw | rw | rw | rw | rw | rw | rw | rw | rw | rw | rw |
| Default | 1 | 1 | 1 | 1 | 1 | 1 | 0 | 0 | 0 | 0 | 0 | 0 | 0 | 0 | 0 | 0 |

| Bit Positions | Function | Description |
|---|---|---|
| 15 | OH#1 | 0: Not a Frame Synchronization Byte<br>1: Frame Synchronization Byte (FSB) (Default) |
| 14 | OH#2 | 0: Not a Frame Synchronization Byte<br>1: Frame Synchronization Byte (FSB) (Default) |
| 13 | OH#3 | 0: Not a Frame Synchronization Byte<br>1: Frame Synchronization Byte (FSB) (Default) |
| 12 | OH#4 | 0: Not a Frame Synchronization Byte<br>1: Frame Synchronization Byte (FSB) (Default) |
| 11 | OH#5 | 0: Not a Frame Synchronization Byte<br>1: Frame Synchronization Byte (FSB) (Default) |
| 10 | OH#6 | 0: Not a Frame Synchronization Byte<br>1: Frame Synchronization Byte (FSB) (Default) |
| 9 | OH#7 | 0: Not a Frame Synchronization Byte (Default)<br>1: Frame Synchronization Byte (FSB) |
| 8 | OH#8 | 0: Not a Frame Synchronization Byte (Default)<br>1: Frame Synchronization Byte (FSB) |
| 7 | OH#9 | 0: Not a Frame Synchronization Byte (Default)<br>1: Frame Synchronization Byte (FSB) |
| 6 | OH#10 | 0: Not a Frame Synchronization Byte (Default)<br>1: Frame Synchronization Byte (FSB) |
| 5 | OH#11 | 0: Not a Frame Synchronization Byte (Default)<br>1: Frame Synchronization Byte (FSB) |
| 4 | OH#12 | 0: Not a Frame Synchronization Byte (Default)<br>1: Frame Synchronization Byte (FSB) |
| 3 | OH#13 | 0: Not a Frame Synchronization Byte (Default)<br>1: Frame Synchronization Byte (FSB) |
| 2 | OH#14 | 0: Not a Frame Synchronization Byte (Default)<br>1: Frame Synchronization Byte (FSB) |
| 1 | OH#15 | 0: Not a Frame Synchronization Byte (Default)<br>1: Frame Synchronization Byte (FSB) |
| 0 | OH#16 | 0: Not a Frame Synchronization Byte (Default)<br>1: Frame Synchronization Byte (FSB) |

This table defines which of the overhead bytes (1–16) are going to be used as FSBs.

TABLE 3

Frame Synchronization Byte Types

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | OH#1 | OH#2 | OH#3 | OH#4 | OH#5 | OH#6 | OH#7 | OH#8 | OH#9 | OH#10 | OH#11 | OH#12 | OH#13 | OH#14 | OH#15 | OH#16 |
| Mode | rw | rw | rw | rw | rw | rw | rw | rw | rw | rw | rw | rw | rw | rw | rw | rw |
| Default | 0 | 0 | 0 | 1 | 1 | 1 | 0 | 0 | 0 | 0 | 0 | 0 | 0 | 0 | 0 | 0 |

NOTE: If an OH byte is not defined to be an FSB in the Decoder Frame Synchronization Byte Locations Register, the corresponding bit in this register has no significance.

| Bit Positions | Function | Description |
|---|---|---|
| 15 | OH#1 | 0: FSB 1 (Default)<br>1: FSB 2 |
| 14 | OH#2 | 0: FSB 1 (Default)<br>1: FSB 2 |
| 13 | OH#3 | 0: FSB 1 (Default)<br>1: FSB 2 |
| 12 | OH#4 | 0: FSB 1 |

TABLE 3-continued

| | | |
|---|---|---|
| 11 | OH#5 | 1: FSB 2 (Default)<br>0: FSB 1 |
| 10 | OH#6 | 1: FSB 2 (Default)<br>0: FSB 1 |
| 9 | OH#7 | 1: FSB 2 (Default)<br>0: FSB 1 (Default) |
| 8 | OH#8 | 1: FSB 2<br>0: FSB 1 (Default) |
| 7 | OH#9 | 1: FSB 2<br>0: FSB 1 (Default) |
| 6 | OH#10 | 1: FSB 2<br>0: FSB 1 (Default) |
| 5 | OH#11 | 1: FSB 2<br>0: FSB 1 (Default) |
| 4 | OH#12 | 1: FSB 2<br>0: FSB 1 (Default) |
| 3 | OH#13 | 1: FSB 2<br>0: FSB 1 (Default) |
| 2 | OH#14 | 1: FSB 2<br>0: FSB 1 (Default) |
| 1 | OH#15 | 1: FSB 2<br>0: FSB 1 (Default) |
| 0 | OH#16 | 1: FSB 2<br>0: FSB 1 (Default)<br>1: FSB 2 |

TABLE 4

Decoder Framing Controls

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Check to go In-Frame | | | | Check to go Out-of-Frame | | | | Unused | | | FSB Errors Allowed | | | | |
| Mode | rw | rw | rw | rw | rw | rw | rw | rw | ro | ro | rw | rw | rw | rw | rw | rw |
| Default | 0 | 0 | 1 | 0 | 0 | 1 | 0 | 0 | 0 | 0 | 0 | 0 | 1 | 0 | 0 | 0 |

| Bit Positions | Function | Description |
|---|---|---|
| 15:12 | Check to go In-Frame | Number of correct consecutive FSB groups required to go In-Frame. (Default value = 2) |
| 11:8 | Check to go Out-of-Frame | Number of incorrect consecutive FSB groups required to go Out-of-Frame. (Default value = 4) |
| 7:5 | Unused | |
| 5:0 | FSB Errors Allowed | The total number of erred bits allowed in a group of FSBs to still consider a match. (Default value = 8). This number is used regardless of the synchronization state (In-Frame or Out-of-Frame). |

A system and method have been provided that illustrate the advantages of providing programmable FSB values. The advantage of this invention is the ability to fully customize the synchronization methodology, to optimize robustness to noise and synchronization time. The invention specifically illustrates an example using two different FSB values, programmable values of FSBs, programmable gain synchronization, programmable lose synchronization parameters, and programmable bit error tolerance within the FSBs themselves. However, the invention is not limited to an particular number of FSB values, or any specific framing structure. The invention permits users to create different networks that are logically separated from each other so that receivers can easily distinguish between different data sources. Other variations and embodiments of the invention will occur to those skilled in the art.

What is claimed is:

1. A method for variably programming the values of frame synchronization bytes in the communication of a multidimensional digital frame structure, the method comprising:

selecting the values of frame synchronization bytes in the overhead section of a transmitted frame;

selecting the location of the frame synchronization byte values in the overhead section of the transmitted frame;

sending the frame;

receiving the frame;

synchronizing the received frame in response to recognizing the frame synchronization bytes;

wherein synchronizing the received frame in response to recognizing the frame synchronization bytes includes synchronizing the received frame in response to recognizing the synchronization byte values in the received frame;

selecting the values of the frame synchronization bytes in the overhead section of the received frame;

selecting the location of the frame synchronization byte values in the overhead section of the received frame;

wherein selecting the location of frame synchronization byte values in the overhead section of the transmitted frame includes selecting a first frame synchronization byte values in a first number of locations;

wherein selecting the location of the frame synchronization byte values in the received frame includes selecting the first frame synchronization byte value in a second number of locations, less than the first number; and wherein synchronizing the received frame in response to recognizing the frame synchronization bytes includes synchronizing the received frame in response to recognizing the first frame synchronization byte values in the second number of locations.

2. The method of claim 1 wherein selecting the frame synchronization byte values in the received frame includes selecting a first frame synchronization byte value; and wherein synchronizing the received frame in response to recognizing the frame synchronization bytes includes synchronizing the received frame in response to recognizing the first frame synchronization byte value.

3. The method of claim 1 further comprising:

selecting a number of consecutive frames with recognized frame synchronization bytes; and wherein synchronizing the received frame in response to recognizing the frame synchronization bytes includes synchronizing the received frame in response to recognizing the selected frame synchronization byte values in the selected number of consecutive frames.

4. The method of claim 1 wherein selecting the location of the frame synchronization byte values in a transmitted frame includes selecting a first location for a first byte value, and a second location for a second byte value; and wherein synchronizing the received frame in response to recognizing the frame synchronization bytes includes synchronizing the received frame in response to recognizing the first frame synchronization byte values in the first locations and the second byte values in the second locations.

5. The method of claim 1 wherein selecting the location of frame synchronization byte values in the overhead section of a transmitted frame includes selecting first frame synchronization byte values in first locations; and wherein selecting the location of the frame synchronization byte values in the overhead section of the received frame includes selecting the first frame synchronization byte values in the first locations.

6. The method of claim 1 further comprising:

selecting a bit error rate of the frame synchronization byte values.

7. The method of claim 6 wherein selecting the bit error rate includes selecting an average bit error rate for the selected frame synchronization byte values.

8. The method of claim 6 wherein synchronizing the received frame in response to recognizing the frame synchronization bytes includes recognizing frame synchronization byte values having a bit error rate less than, or equal to, the selected frame synchronization bit error rates.

9. The method of claim 1 further comprising:

defining a superframe structure with a predetermined number of frames per superframe; and wherein selecting the values of frame synchronization bytes in the overhead section of a transmitted frame includes selecting byte values to be used for synchronization in the overhead section of each frame of the superframe;

wherein sending the frame includes sending the frame in the superframe structure; and wherein synchronizing the received frame in response to recognizing the frame synchronization bytes includes recognizing frame synchronization byte values in each frame of the superframe.

10. The method of claim 9 further comprising:

selecting a quantity of frame synchronization byte values in the overhead section of the received frame.

11. The method of claim 10 wherein selecting the quantity of frame synchronization byte values in the received frame includes selecting a quantity of byte values for each frame of the superframe; and wherein synchronizing the received frame in response to recognizing the frame synchronization bytes includes recognizing the selected quantity of frame synchronization byte values in each frame of the superframe.

12. The method of claim 11 wherein selecting the quantity of frame synchronization byte values includes selecting a first number of frame synchronization byte values in a first frame; and wherein synchronizing the received frame in response to recognizing frame synchronization bytes includes recognizing the first number of frame synchronization byte values in the first frame.

13. The method of claim 11 wherein selecting the quantity of frame synchronization byte values in the received frame includes selecting a first number of frame synchronization bytes having a first value, and a second number of frame synchronization bytes having a second value; and wherein synchronizing the received frame in response to recognizing the frame synchronization bytes includes synchronizing the received frame in response to recognizing the first number of frame synchronization bytes having the first value, and the second number of frame synchronization bytes having the second value.

14. The method of claim 11 further comprising:

selecting a quantity of frame synchronization bytes in the overhead section of the transmitted frame.

15. The method of claim 14 wherein selecting the quantity of the frame synchronization byte values in the transmitted frame includes selecting a first number of frame synchronization bytes having a first value, and a second number of frame synchronization bytes having a second value;

wherein selecting the quantity of frame synchronization bytes in the received frame includes selecting a third number of frame synchronization bytes, less than the first number, having the first value, and a fourth number of frame synchronization bytes, less than the second number, having the second value; and wherein synchronizing the received frame in response to recognizing the frame synchronization bytes includes synchronizing the received frame in response to recognizing the third number of frame synchronization bytes having the first value, and the fourth number of frame synchronization bytes having the second value.

16. The method of claim 1 further comprising:

selecting a number of consecutive received frames in which frame synchronization bytes values are not recognized; and falling out of synchronization in response to not recognizing frame synchronization bytes values in the selected number of received frames.

17. A method for variably programming the values of frame synchronization bytes in the communication of a multidimensional digital frame structure, the method comprising:

selecting the values of frame synchronization bytes in the overhead section of a transmitted frame;

selecting the location of the frame synchronization byte values in the overhead section of the transmitted frame;
sending the frame;
receiving the frame;
synchronizing the received frame in response to recognizing the frame synchronization bytes;
wherein synchronizing the received frame in response to recognizing the frame synchronization bytes includes synchronizing the received frame in response to recognizing the synchronization byte values in the received frame;
selecting the values of the frame synchronization bytes in the overhead section of the received frame;
selecting the location of the frame synchronization byte values in the overhead section of the received frame;
defining a superframe structure with a predetermined number of frames per superframe;
wherein selecting the values of frame synchronization bytes in the overhead section of the transmitted frame includes selecting byte values to be used for synchronization in the overhead section of each frame of the superframe;
wherein sending the frame includes sending the frame in the superframe structure;
wherein synchronizing the received frame in response to recognizing the frame synchronization bytes includes recognizing frame synchronization byte values in each frame of the superframe;
selecting the quantity of frame synchronization byte values in the overhead section of the received frame;
wherein selecting the quantity of frame synchronization byte values in the received frame includes selecting a quantity of byte values for each frame of the superframe; and
wherein synchronizing the received frame in response to recognizing the frame synchronization bytes includes recognizing the selected quantity of frame synchronization byte values in each frame of the superframe;
selecting a quantity of frame synchronization bytes in the overhead section of the transmitted frame;
wherein selecting the quantity of the frame synchronization byte values in the transmitted frame includes selecting a first number of frame synchronization bytes having a first value, and a second number of frame synchronization bytes having a second value;
wherein selecting the quantity of frame synchronization bytes in the received frame includes selecting a third number of frame synchronization bytes, less than the first number, having the first value, and a fourth number of frame synchronization bytes, less than the second number, having the second value; and
wherein synchronizing the received frame in response to recognizing the frame synchronization bytes includes synchronizing the received frame in response to recognizing the third number of frame synchronization bytes having the first value, and the fourth number of frame synchronization bytes having the second value.

* * * * *

UNITED STATES PATENT AND TRADEMARK OFFICE
CERTIFICATE OF CORRECTION

PATENT NO. : 6,973,099 B1
DATED : December 6, 2005
INVENTOR(S) : Bendek et al.

It is certified that error appears in the above-identified patent and that said Letters Patent is hereby corrected as shown below:

Title page,
Item [56], References Cited, U.S. PATENT DOCUMENTS, add the following:
-- 4,298,987 A  11/1981   Stattel et al
   4,575,864 A  03/1986   Rice et al
   5,550,833 A  08/1996   Fujisawa
   5,646,947 A  07/1997   Cooper et al.
   5,896,426 A  04/1999   Ramamurthy et al
   5,898,743 A  04/1999   Shoji et al
   5,982,830 A  11/1999   Maturi et al
   5,987,038 A  11/1999   Staszewski et al
   6,400,734 A  06/2002   Weigand
   6,445,719 B1 09/2002   Schneider et al --.

Signed and Sealed this

Fourth Day of April, 2006

JON W. DUDAS
*Director of the United States Patent and Trademark Office*